United States Patent [19]
Unckrich

[11] Patent Number: 5,904,403
[45] Date of Patent: May 18, 1999

[54] FITTING FOR VEHICLE SEAT, PARTICULARLY MOTOR VEHICLE SEAT

[75] Inventor: Hermann Unckrich, Alsenz, Germany

[73] Assignee: Keiper GmbH & Co., Remscheid, Germany

[21] Appl. No.: 08/921,988

[22] Filed: Aug. 28, 1997

[30] Foreign Application Priority Data

Aug. 30, 1996 [DE] Germany ............. 296 15 132 U

[51] Int. Cl.$^6$ ...................................................... B06N 2/10
[52] U.S. Cl. ........................................................ 297/378.12
[58] Field of Search ............................ 297/378.11, 378.12

[56] References Cited

U.S. PATENT DOCUMENTS

| | | | |
|---|---|---|---|
| 4,294,488 | 10/1981 | Pickles ............................... | 297/378.11 |
| 4,358,155 | 11/1982 | Osterhold et al. ................. | 297/378.11 |
| 5,383,699 | 1/1995 | Woziekonski et al. ............ | 297/378.12 |
| 5,611,600 | 3/1997 | Busch et al. ....................... | 297/378.12 |

FOREIGN PATENT DOCUMENTS

| | | | |
|---|---|---|---|
| 4324691 | 1/1995 | Germany ........................... | 297/378.12 |
| 195 31 018 | 2/1997 | Germany . | |

*Primary Examiner*—Peter M. Cuomo
*Assistant Examiner*—Anthony D. Barfield
*Attorney, Agent, or Firm*—Friedrich Kueffner

[57] ABSTRACT

A fitting for vehicle seats, particularly motor vehicle seats, includes an adjustable fitting component connected to the back rest of the seat and a stationary fitting component at the seat portion, wherein the stationary fitting component is mounted at its front end so as to be pivotable about an axle pin rigidly connected to the seat portion, and wherein the rear end portion of the stationary fitting component rests on a stop pin rigidly attached to the seat portion. In the locked position of the stationary fitting component, the stop pin is surrounded by the jaw of a catch hook mounted on the stationary fitting component, wherein the locked position is releasably secured by a locking device. The locking device includes an eccentric tensioning member which supports the catch hook in the locked position and is supported on a pin of the stationary fitting component, and a gear plate which is mounted on the eccentric tensioning member and surrounds the pin with an oblong hole. The gear plate has a control cam which over portions thereof interacts with a support pin of the stationary fitting component and to which is hinged a pull member which acts in a releasing direction against the force of a retaining spring. The eccentric tensioning member has a locking projection which faces the catch hook. In the open position of the catch hook, the locking projection engages in a recess provided on the catch hook and, in this position, the locking projection is held by a retaining spring extending between the gear plate acting on the eccentric tensioning member and the catch hook. The catch hook has an actuating projection protruding beyond the jaw of the catch hook for releasing the open position when making contact with the stop pin rigidly connected to the seat portion during the backward swinging movement of the back rest.

6 Claims, 2 Drawing Sheets

FITTING FOR VEHICLE SEAT, PARTICULARLY MOTOR VEHICLE SEAT

BACKGROUND OF THE INVENTION

1. Field of the Invention

The present invention relates to a fitting for vehicle seats, particularly motor vehicle seats. The fitting includes an adjustable fitting component connected to the back rest of the seat and a stationary fitting component at the seat portion, wherein the stationary fitting component is mounted at its front end so as to be pivotable about an axle pin rigidly connected to the seat portion, and wherein the rear end portion of the stationary fitting component rests on a stop pin rigidly attached to the seat portion. In the locked position of the stationary fitting component, the stop pin is surrounded by the jaw of a catch hook mounted on the stationary fitting component, wherein the locked position is releasably secured by a locking device. The locking device includes an eccentric tensioning member which supports the catch hook in the locked position and is supported on a pin of the stationary fitting component, and a gear plate which is mounted on the eccentric tensioning member and surrounds the pin with an oblong hole. The gear plate has a control cam which over portions thereof interacts with a support pin of the stationary fitting component and to which is hinged a pull member which acts in a releasing direction against the force of a retaining spring.

2. Description of the Related Art

In a fitting for vehicle seats of the above-described type disclosed in DE 195 31 018, in which the possibility is provided for pivoting the back rest forward for facilitating entering the rear of two-door passenger cars, a locking lever is mounted on the fitting component connected to the seat portion for maintaining the release position of the catch hook, wherein, in the open position of the catch hook, the locking lever engages with a locking projection arranged at its locking arm in a recess of the locking cam and wherein, in this position maintaining the non-operative position of the locking cam, the locking lever is held by a retaining spring tensioned between the gear plate and the locking lever until a control arm provided on the locking lever makes contact with the stop pin rigidly connected to the seat portion when the back rest is swung back into its position of use. This causes the locking cam to be released from its locked position by the backward pivoting of the locking lever, so that the catch hook, which previously has already engaged the stop pin rigidly connected to the seat portion, is secured in its locked position as a result of the backward pivoting of the locking cam. Aside from the fact that the catch hook must be provided underneath its jaw with an inclined opening portion, the locking lever constitutes an additional structural component which must be mounted on the fitting component attached to the seat portion, so that the fitting is not economical because of the increased requirements with respect to structural components and manufacture thereof.

SUMMARY OF THE INVENTION

Therefore, it is the primary object of the present invention to provide a fitting for vehicle seats of the above-described type which are less expensive to manufacture.

In accordance with the present invention, the eccentric tensioning member has a locking projection which faces the catch hook. In the open position of the catch hook, the locking projection engages in a recess provided on the catch hook and, in this position, the locking projection is held by a retaining spring extending between the gear plate acting on the eccentric tensioning member and the catch hook. The catch hook has an actuating projection protruding beyond the jaw of the catch hook for releasing the open position when making contact with the stop pin rigidly connected to the seat portion during the backward swinging movement of the back rest.

Since the catch hook at the end of the backward swinging movement of the back rest is by itself capable of releasing the open position by the actuating projection making contact with the stop pin, it is not necessary to provide either a locking lever or a stop pin for limiting the closing movement of the catch hook.

In accordance with an advantageous further development of the eccentric tensioning member, the eccentric tensioning member is provided with three arms, wherein a lower arm has a lower eccentric cam for tensioning the catch hook, wherein, on the side facing the catch hook, the eccentric cam extends toward the locking projection, while the side of the lower arm located opposite the locking projection serves to act on and lock the gear plate tensioned by the retaining spring. The upper arm of the eccentric tensioning member serves to be acted upon by the gear plate for releasing the eccentric tensioning member. The middle arm is connected in an articulated manner to the gear plate which is provided with an oblong hole which surrounds the pin rigidly connected to the fitting component, so that the gear plate is moveable relative to the pin. When the eccentric tensioning member is released, in order to prevent the eccentric tensioning member from pivoting beyond the distance required for the release, the catch hook preferably has a stop arm which limits the release movement introduced into the eccentric tensioning member, wherein the stop arm extends with respect to its mounting point at the stationary fitting component beyond this stationary fitting component and is located opposite the jaw of the catch hook.

The catch hook, the eccentric tensioning member and the gear plate are preferably arranged in a plane, wherein the central portion of the gear plate which is provided with the oblong hole and the bearing bore for the connecting pin to the eccentric tensioning member is offset relative to this plane by the thickness of the eccentric tensioning member. In addition, the gear plate preferably has a tensioning arm acted upon by the retaining spring and actuating the lower arm of the eccentric tensioning member, and a releasing arm acting upon the upper arm of the eccentric tensioning member for unlocking. On its side facing the axle pin supporting the stationary fitting component, the releasing arm has a control cam which forms its outer contour. This control cam is advantageously constructed as a circle section which is curved around the pin surrounding the eccentric tensioning member. The circle portion is dimensioned in such a way that, in the released position of the catch hook, the control cam is in contact with the support pin of the stationary fitting component, while in the locked position of the catch hook, the releasing arm of the gear plate with the control cam is freely swung under the support pin.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
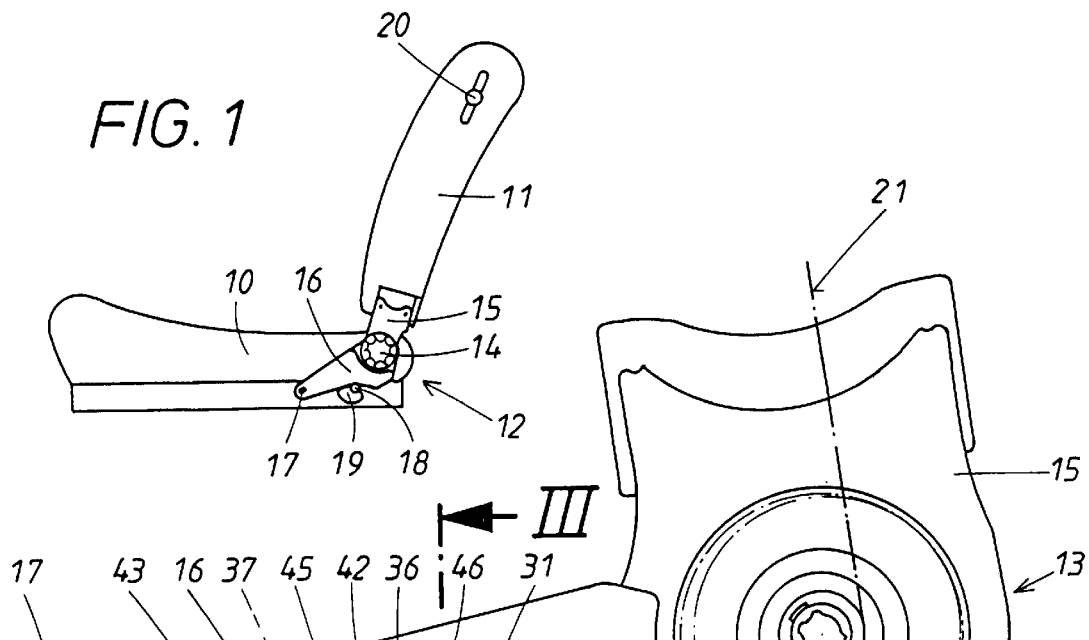
FIG. 1 is a schematic side view of a seat of a passenger car with the back rest being shown in the position of use.

The seat illustrated in FIG. 1 has between the seat portion 10 and the back rest 11 a fitting 12 which, for adjusting the inclination of the back rest, has an adjusting and locking gear mechanism of the known type which, for example, can be actuated by a handle 14 constructed as a rotary knob. While one connecting part of the adjusting and locking gear mechanism 13 forms an adjustable fitting component 12 attached to the back rest 11, the other member of the adjusting and locking gear mechanism is connected through a lug to a stationary fitting component 16, provided on the seat portion 10. This stationary fitting component 16 of the fitting 12 is mounted so as to be pivotable on an axle pin 17 attached to the seat portion and, in the position of use of the back rest, rests with the underside on a stop pin 18 which is also attached to the seat portion. In the locked position, this stop pin 18 is surrounded by the jaw of a catch hook 19 which is pivotally mounted on the stationary fitting component 16. In the adjusted position of the back rest, the fitting forms a rigid unit which can be pivoted forwardly together with the back rest 11 about the axle pin 17 when the catch hook 19 is swung away from the stop 18 by releasing the locking device of the catch hook 19. This is effected by means of a releasing lever 20 which is arranged in the upper portion of the outer side wall of the back rest 11, wherein the releasing lever 20 is connected through a Bowden control or cable operated control 21 or the like to the locking device for the catch hook 19.

As can be seen in FIGS. 2–6, the catch hook 19 is rotatably mounted above its jaw 22 on a flange bolt 23 which is attached to a stationary fitting component 16. The jaw 22 of the catch hook 19 continues above the stop pin 18 as an actuating projection 24 which protrudes beyond the portion of the catch hook 19 which engages behind the stop pin 18. The catch hook 19 has, obliquely offset relative to the axle pin 17 and above its point of mounting on the flange bolt 23, a contact surface 25 which continues in a wave-like recess 26 in the outer circumferential contour of the catch hook 19.

On the side located opposite the recess 26, the contact surface 25 of the catch hook 19 continues as a stop arm 27 which protrudes beyond the flange bolt 23 toward the top. A pin 28 is provided between the jaw of the catch hook and the bearing point of the catch hook surrounding the flange bolt and offset relative to the recess 26, wherein the pin 28 is provided with a circumferential groove and forms one of the connection points of a tension spring serving as a retaining spring 29.

A pin 30 which is secured to the stationary fitting component 16 and serves to support an eccentric tensioning member 31 is arranged above and at a distance from the contact surface 25 of the catch hook 19. The eccentric tensioning member 31 has a lower arm 32 whose bottom side is formed by an eccentric cam 33 which, in the locked position shown in FIGS. 2–4, acts over portions thereof on the contact surface 25 of the catch hook 19 and is responsible for securing the locked position of the catch hook 19. While the side of the lower arm 32 of the eccentric tensioning member 31 facing the axle pin 17 forms a contact surface whose purpose will be explained later, the opposite side at the lower arm 32 at the transition to the eccentric cam 33 is constructed as a locking projection 34. The upper arm 35 of the eccentric tensioning member 31 also has a contact surface 36 facing the axle pin 17, wherein the function of the contact surface 36 will also be explained later. Finally, the middle arm 37 of the eccentric tensioning member 31 is arranged in front of the pin 30 and facing toward the axle pin 17, wherein the middle arm 37 is connected so as to be rotatable to a gear plate 39 through a bolt 38.

This gear plate 39 has a tensioning arm 40 which is acted upon by the contact surface of the lower arm 32 of the eccentric tensioning member 31 for maintaining the locked position of the catch hook 19. For this purpose, an angle-shaped portion 41 is integrally formed on the tensioning arm 40 of the gear plate 39, wherein the angle-shaped portion 41 acts as the second abutment for the other end of the retaining spring 29 constructed as a tension spring. On the other hand, the gear plate 39 has a releasing arm 42 which, in the released state, acts on the contact surface 36 of the upper arm 35 of the eccentric tensioning member 31. The releasing arm 42 has on its side facing the axle pin 17 of the stationary fitting component 16 a control cam 43 forming its outer contour which is constructed as a circular portion curved around the pin 30. While the tensioning arm 40 and the releasing arm 42 of the gear plate 39 are arranged in one plane with the eccentric tensioning member 31, the middle portion of the gear plate 39 mounted on the bolt 38 is bent by the thickness of the eccentric tensioning member 31 in such a way that this middle portion of the gear plate 39 can surround with an oblong hole 44 the pin 30 next to the eccentric tensioning member 31, as can best be seen in FIG. 3.

In order to provide the necessary freedom to the oblong hole 44 to permit pivoting, the oblong hole 44 may be curved at a radial distance around the bolt 38 and may be somewhat longer than required for the shifting movement. The releasing arm 42 of the gear plate 39 has a bore 45 to which a pull member, for example, constructed as a Bowden control 21, can be attached for shifting the catch hook into its released position. A support pin 46 is located above the releasing arm 42 on the fitting component 16 connected to the seat portion, wherein the position of the support pin 46 is selected in such a way that the support pin 46 can come into contact with the control cam 43 for holding the catch hook 19 in the open position.

Figure 2:
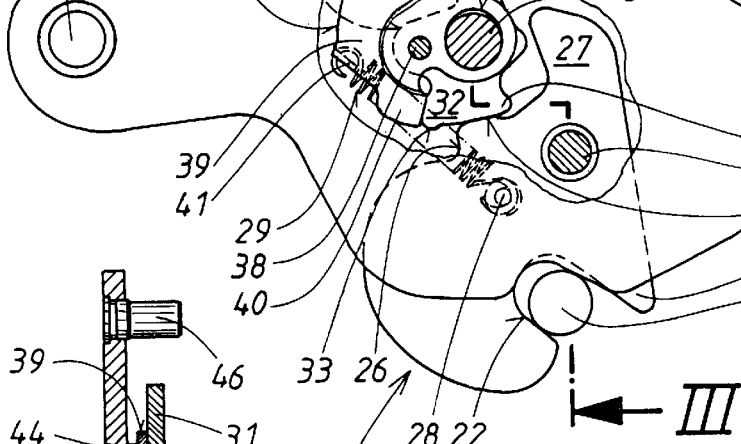
FIG. 2 is a side view, on a larger scale as compared to FIG. 1, showing the catch hook of the fitting according to the present invention in its locking position in which the catch hook is located at the inner side of the stationary fitting component which is connected forwardly pivotably to the seat portion, wherein the stationary fitting component, for a clearer illustration of the locking device, is broken away in the area of the locking device.
Figure 3:
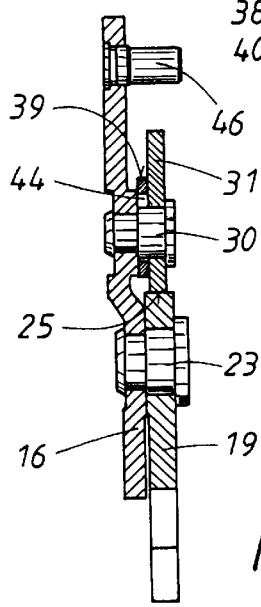
FIG. 3 is a sectional view taken along sectional line III—III of FIG. 2.
Figure 4:
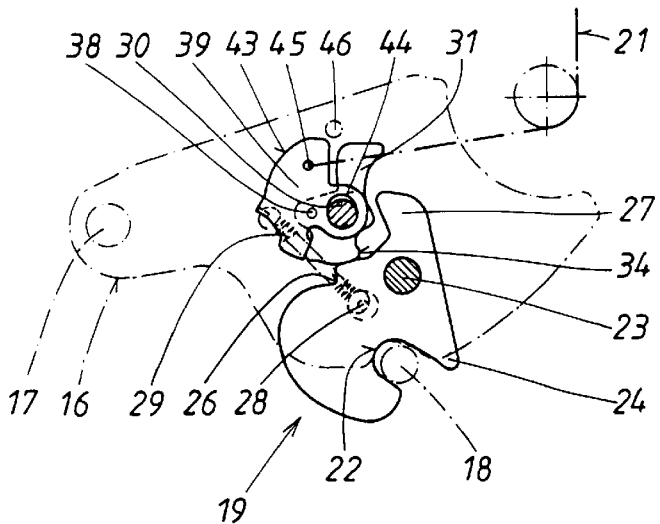
FIG. 4 shows the locking device of FIGS. 2 and 3, on a smaller scale as compared to FIG. 2, in the locked position of the catch hook, wherein the stationary fitting component is shown in dash-dot lines.

In the position of use of the back rest 11 shown in FIG. 1, the stationary fitting component 16 is in the position illustrated in FIGS. 2 and 4 and is tightly connected to the seat portion 10 by means of the catch hook 19 whose jaw 22 engages under the stop pin 18, wherein the upper side of the stop pin 18 rests against the bottom side of the fitting component 16 so as to prevent rattling. In this locked position, the catch hook 19 is supported by a locking device which is composed of the eccentric tensioning member 31, the gear plate 39 and the restoring spring 29, wherein the retaining spring 29 holds the eccentric cam 33 of the eccentric tensioning member 31 in contact with the contact surface 25 of the catch hook 19. As a result of the action of this restoring spring, when the locked position is maintained, the tensioning arm 40 rests against the lower arm 32 of the eccentric tensioning member 31. The eccentric cam 33 supports through its contact surface 25 the catch hook 19 in such a way that the secured position of the catch hook 19 is maintained.

Figure 5:
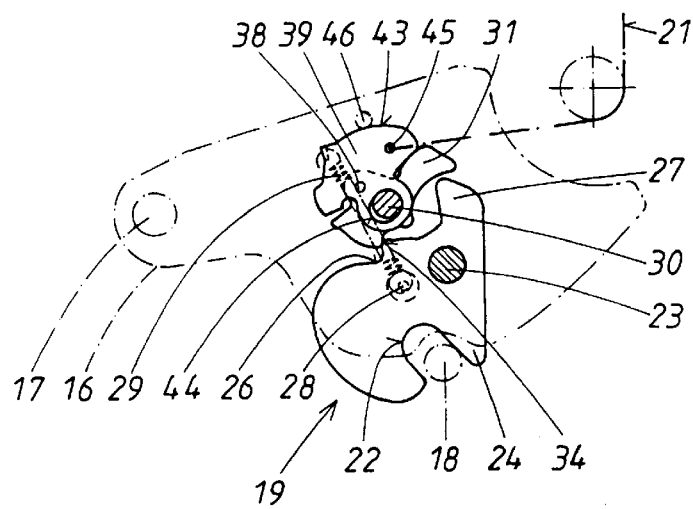
FIG. 5 shows the locking device of FIG. 4 in an intermediate position of the catch hook as the catch hook travels to the releasing position.
Figure 6:
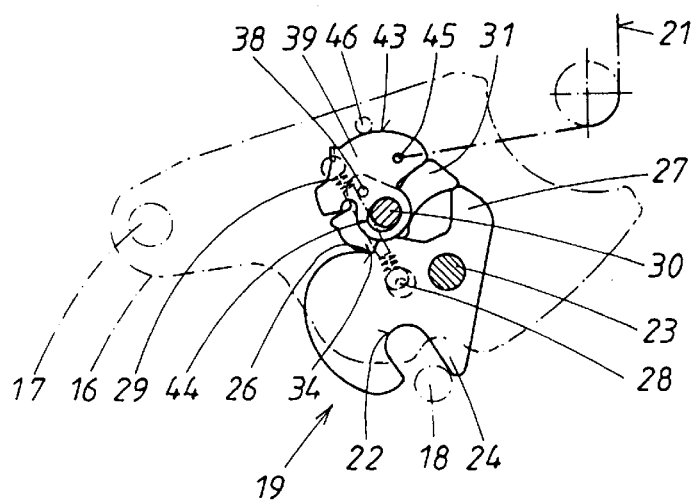
FIG. 6 shows the locking device shown in FIGS. 4 and 5 in the position immediately prior to pivoting the back rest forwardly in which the catch hook has been moved into its final releasing position.

When the back rest is to be pivoted forwardly about the axle pin 17 for facilitating entering the rear of a two-door passenger car, first the releasing lever 20 and the Bowden control 21 connected to the releasing lever 20 and attached at 45 to the gear plate 39 must be actuated in such a way that the gear plate 39 finally swings into the position shown in FIG. 6. Already at the beginning of the introduction of a pull force into the Bowden control 21 and, thus, at the beginning of the pivoting of the gear plate 39, the gear plate 39 initially pivots about the bolt 38. Simultaneously, the releasing arm 42 of the gear plate 39 comes into contact with the contact surface 36 of the upper arm 35 of the eccentric tensioning member 31, so that, when the Bowden control 21 is pulled further together with the gear plate 39, the eccentric tensioning member 31 is pivoted clockwise against the force of the retaining spring 29 until finally its locking projection 34 travels over the inlet edge to the recess 26 of the catch hook 19. As a result of the effect of the retaining spring 29, the jaw 22 of the catch hook 19 has been moved further away from the stop pin 18 by clockwise pivoting of the catch hook 19. The gear plate is pushed further downwardly through its control cam 43 resting against the support pin 46. This situation is illustrated in FIG. 5.

Whether or not a further pull force is applied to the Bowden control 21, the retaining spring 29 mounted between the angle-shaped portion 41 of the gear plate 39 and the pin 28 on the catch 19 ensures already that the locking projection 34 at the lower arm 32 of the eccentric tensioning member 31 completely moves into the recess 26 of the catch hook 19, wherein a further pivoting of the catch hook 19 in a clockwise direction takes place, so that the position of the locking device shown in FIG. 6 is reached and maintained.

While in the locked position shown in FIGS. 2 and 4 the portion of the jaw 22 provided with the actuating projection 24 does not contact the stop pin 18, when the catch hook is pivoted in a clockwise direction this portion of the jaw 22 comes into contact with the stop pin 18 and, consequently, presses the stationary fitting component upwardly in a counterclockwise direction, so that the bottom side of the stationary fitting component no longer rests on the stop pin 18. In the position shown in FIG. 6, the lower portion of the catch hook 19 has released the stop pin 18 to such an extent that the back rest 11 together with the stationary component 16 can be pivoted forwardly without problems about the axle pin 17 in a counterclockwise direction.

If after the back rest has been pivoted forwardly, the back rest is again pivoted back into the position of use shown in FIG. 1, initially the actuating projection 24 of the catch hook makes contact with the stop pin 18, as shown in FIG. 6. When the back rest is moved back energetically, the inertia force which is greater than the weight of the back rest causes a pivoting movement of the catch hook in a counterclockwise direction and against the force of the retaining spring 29 about the flange bolt 23, so that also the contact between the locking projection 34 of the eccentric tensioning member 31 and the recess 26 of the catch hook 19 is released. However, this can also be effected by slowly pressing the back rest backwardly with force and without moving the backrest quickly. In either case, the eccentric cam 33 again reaches through the contact surface 25 the catch hook 19, so that, when the releasing lever 20 is released, the retaining spring 29 is capable of again producing the locked position shown in FIGS. 2 and 4, wherein the gear plate 39 as well as the eccentric tensioning member 31 are moved counterclockwise into their original locked position, and the catch hook 19 is secured in its locking position.

While specific embodiments of the invention have been shown and described in detail to illustrate the inventive principles, it will be understood that the invention may be embodied otherwise without departing from such principles.

I claim:

1. A fitting comprising an adjustable fitting component adapted to be connected to a back rest of a vehicle seat and a stationary fitting component adapted to be connected to a seat portion of the seat, the stationary fitting component having a front end and being mounted at the front end so as to be pivotable about an axle pin adapted to be rigidly connected to the seat portion, wherein a rear end portion of the stationary fitting component rests on a stop pin adapted to be rigidly attached to the seat portion, wherein, in a locked position of the stationary fitting component, the stop pin is surrounded by a jaw of a catch hook mounted on the stationary fitting component, a locking device for releasably securing the locked position, the locking device comprising an eccentric tensioning member supporting the catch hook in the locked position and being supported on a pin of the stationary fitting component, the locking device further comprising a gear plate mounted on the eccentric tensioning member and having an oblong hole surrounding the pin, the gear plate having a control cam which over portions thereof interacts with a support pin of the stationary fitting component and to which is hinged a pull member which acts in a releasing direction against the force of a retaining spring, wherein the eccentric tensioning member has a locking projection which faces the catch hook, wherein, in an open position of the catch hook, the locking projection engages in a recess of the catch hook and, in this open position, the locking projection is held by the retaining spring extending between the gear plate acting on the eccentric tensioning member and the catch hook, and wherein the catch hook has an actuating projection protruding beyond the catch hook for releasing the open position when making contact with the stop pin adapted to be rigidly connected to the seat portion during a backward swinging movement of the back rest.

2. The fitting according to claim 1, wherein the eccentric tensioning member has a lower arm, a middle arm and an upper arm, wherein the lower arm has a lower eccentric cam for tensioning the catch hook, wherein, on a side facing the catch hook, the eccentric cam extends toward the locking projection, while a side of the lower arm located opposite the locking projection is configured to act on and lock the gear plate tensioned by the retaining spring, the upper arm of the eccentric tensioning member being acted upon by the gear plate for releasing the eccentric tensioning member, and wherein the middle arm is connected in an articulated manner to the gear plate provided with the oblong hole surrounding the pin adapted to be rigidly connected to the fitting component, so that the gear plate is moveable relative to the pin.

3. The fitting according to claim 1, wherein the catch hook comprises a stop arm for limiting a releasing movement introduced into the eccentric tensioning member, the stop arm being located opposite the jaw of the catch hook and protruding beyond a bearing point of the catch hook on the stationary fitting component.

4. The fitting according to claim 1, wherein the catch hook, the eccentric tensioning member and the gear plate are arranged in a plane, the gear plate having a central portion with the oblong hole and a bearing bore for a connecting bolt to the eccentric tensioning member, the central portion being offset relative to the plane by a thickness of the eccentric tensioning member.

5. The fitting according to claim 2, wherein the gear plate comprises a releasing arm connected to the retaining spring for actuating the lower arm of the eccentric tensioning member and for acting on the upper arm of the eccentric tensioning member for an unlocking operation, wherein the releasing arm has at a side facing the axle pin supporting the stationary fitting component a control cam forming an outer contour of the releasing arm.

6. The fitting according to claim 5, wherein the control cam is formed as a circular portion curved around the pin supporting the eccentric tensioning member, wherein the circular portion is dimensioned such that, in the open position of the catch hook, the control cam is in contact with the support pin of the stationary fitting component, while, in the locked position of the catch hook, the releasing arm of the gear plate with the control cam is swung freely under the support pin.

* * * * *